(12) United States Patent  
Li (10) Patent No.: US 8,792,129 B2
(45) Date of Patent: Jul. 29, 2014

(54) PRINTING APPARATUS TO CONTROL IMAGES TO BE LAID OUT SIDE BY SIDE

(71) Applicant: Quanhe Li, Nagoya (JP)

(72) Inventor: Quanhe Li, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 49 days.

(21) Appl. No.: 13/677,814

(22) Filed: Nov. 15, 2012

(65) Prior Publication Data

US 2013/0135634 A1 May 30, 2013

(30) Foreign Application Priority Data

Nov. 29, 2011 (JP) ................................. 2011-260682

(51) Int. Cl.
*H04N 1/387* (2006.01)
(52) U.S. Cl.
USPC ........................... 358/1.18; 358/450; 358/453
(58) Field of Classification Search
CPC ..................................................... H04N 1/3876
See application file for complete search history.

(56) References Cited

U.S. PATENT DOCUMENTS

| | | | | |
|---|---|---|---|---|
| 5,452,105 A | * | 9/1995 | Tamagaki et al. | 358/453 |
| 5,481,375 A | * | 1/1996 | Eto et al. | 358/450 |
| 5,585,936 A | * | 12/1996 | Eto et al. | 358/450 |
| 5,608,543 A | * | 3/1997 | Tamagaki et al. | 358/450 |
| 5,625,720 A | * | 4/1997 | Miyaza et al. | 382/284 |
| 5,644,411 A | * | 7/1997 | Tamagaki et al. | 358/453 |
| 5,654,807 A | * | 8/1997 | Miyaza | 358/450 |
| 6,571,022 B2 | * | 5/2003 | Okisu et al. | 382/294 |
| 6,690,482 B1 | * | 2/2004 | Toyoda et al. | 358/450 |
| 8,503,032 B2 | * | 8/2013 | Takeuchi | 358/1.18 |
| 8,564,821 B2 | * | 10/2013 | Naruse | 358/450 |

FOREIGN PATENT DOCUMENTS

JP 07-240832 9/1995

* cited by examiner

*Primary Examiner* — Scott A Rogers
(74) *Attorney, Agent, or Firm* — Banner & Witcoff, Ltd.

(57) ABSTRACT

A printing apparatus wherein first image data corresponding to a first document is generated, second partial data corresponding to a partial range of a second document is generated in a state in which the first image data is stored in a storage portion, joint data in which first partial data and the second partial data are joined is generated, the first partial data being included in the first image data and corresponding to a partial range of the first document which is laid out side by side with respect to the partial range of the second document based on the second partial data in a state in which a first image based on the first image data and a second image based on second image data are laid out side by side in a scanning direction of a head, and an image based on the joint data is printed.

7 Claims, 3 Drawing Sheets

PRINTING APPARATUS TO CONTROL IMAGES TO BE LAID OUT SIDE BY SIDE

CROSS REFERENCE TO RELATED APPLICATION

The present application claims priority from Japanese Patent Application No. 2011-260682, which was filed on Nov. 29, 2011, the disclosure of which is herein incorporated by reference in its entirety.

BACKGROUND OF THE INVENTION

1. Field of the Invention

The present invention relates to a printing apparatus equipped with a printing portion having a recording head for ejecting ink.

2. Description of Related Art

Proposals relating to image printing have been made. For instance, there has been disclosed a digital copying machine configured to read images of a series of documents in plural pages and to output the images such that the images are edited on one sheet. In the digital copying machine, document images are deployed one page by one page in image memory until reading of all documents is completed. When no documents exist on a tray, the document images deployed in the image memory are outputted such that the document images are formed on the sheet one page by one page.

SUMMARY OF THE INVENTION

Printing apparatuses having a copying function are commercially practical. In some of the printing apparatuses, a printing portion for printing images is constituted by an ink-jet printing portion. Where the copying function is executed in the printing apparatus with such a printing portion, a document set in the printing apparatus is read and a recording medium is conveyed so as to pass the printing portion. When image printing is performed, in the printing portion, a recording head configured to eject ink is reciprocated in a scanning direction orthogonal to a conveyance direction in which the recording medium is conveyed. In the reciprocating movement, the ink is ejected from the recording head to the recording medium that is being conveyed so as to pass the printing portion. Thus, an image corresponding to the read document is printed on the recording medium in the printing apparatus.

In the copying function of the printing apparatus, images of plural pages can be printed on one-page recording medium. There is an instance in which the images of the plural pages are laid out side by side in the scanning direction of the recording head. In this instance, if image printing does not start until reading of the plural pages of documents is finished and image data corresponding to the plural pages of documents is formed for images of all of the plural pages which are laid out side by side on the one-page recording medium, a time required for image printing may be increased. As a result, there may be a risk that the image printing cannot be suitably performed.

It is therefore an object of the present invention to provide a printing apparatus configured to read plural pages of documents and to suitably print images of the plural pages of documents such that the images are laid out side by side in a scanning direction in which a recording head reciprocates.

The above-indicated object may be achieved according to a principle of the present invention, which provides a printing apparatus, comprising:

a scanning portion configured to read a document in unit of a line extending in a first direction, from one end to the other end in a second direction orthogonal to the first direction, a data generating portion configured to generate image data that corresponds to the document read by the scanning portion, a storage portion in which the image data generated by the data generating portion is stored, a conveyor portion configured to convey a recording medium on which an image is to be printed, a printing portion which includes a recording head, the printing portion being configured to reciprocate the recording head in a scanning direction orthogonal to a conveyance direction in which the recording medium is conveyed by the conveyor portion and configured to print an image based on the image data generated by the data generating portion, on the recording medium conveyed by the conveyor portion, and a command receive portion configured to receive a print command to print a first image based on first image data corresponding to a first document and a second image based on second image data corresponding to a second document, such that the first image and the second image are laid out side by side in the scanning direction of the recording head, wherein the scanning portion is configured to read the first document when the print command is received by the command receive portion and is configured to read the second document in a state in which the reading of the first document has been completed, wherein the data generating portion is configured
to generate the first image data corresponding to the first document the reading of which by the scanning portion has been completed and to store the generated first image data in the storage portion,
to generate, in a state in which the first image data is stored in the storage portion, second partial data corresponding to a partial range of the second document which is obtained by dividing the second document in the second direction and which is a range read by the scanning portion, and
to generate joint data in which first partial data and the second partial data are joined, the first partial data being included in the first image data stored in the storage portion and corresponding to a partial range of the first document which is obtained by dividing the first document in the second direction and which is laid out side by side with respect to the partial range of the second document based on the second partial data in a state in which the first image and the second image are laid out side by side in the scanning direction, and wherein the printing portion is configured to print an image based on the joint data generated by the data generating portion, on the recording medium conveyed by the conveyor portion.

The second partial data is data that corresponds to the partial range of the second document obtained by dividing the second document in the second direction. In view of this, the second partial data may be referred to as data which represents an image obtained by dividing the second image in the second direction (the conveyance direction) so as to correspond to the division of the second document in the second direction. Accordingly, "the partial range of the second document based on the second partial data" may be referred to as an image obtained by dividing the second image in the second direction (the conveyance direction) so as to correspond to the division of the second document in the second direction. The first partial data is data that corresponds to the partial range of the first document obtained by dividing the first document in the second direction. In view of this, the first partial data may be referred to as data which represents an image obtained by dividing the first image in the second direction (the conveyance direction) so as to correspond to the division of the first document in the second direction.

BRIEF DESCRIPTION OF THE DRAWINGS

The above and other objects, features, advantages and technical and industrial significance of the present invention will be better understood by reading the following detailed description of embodiments of the invention, when considered in connection with the accompanying drawings, in which.

DETAILED DESCRIPTION OF THE EMBODIMENTS

There will be explained embodiments of the present invention with reference to the drawings. It is to be understood that the present invention is not limited to the details of the embodiments described below, but may be embodied with various other changes and modification in a similar technical concept. For instance, the following configuration may be partly omitted, may be partly replaced with other configuration, or may include other configuration.

<Printing Apparatus>

Figure 1:
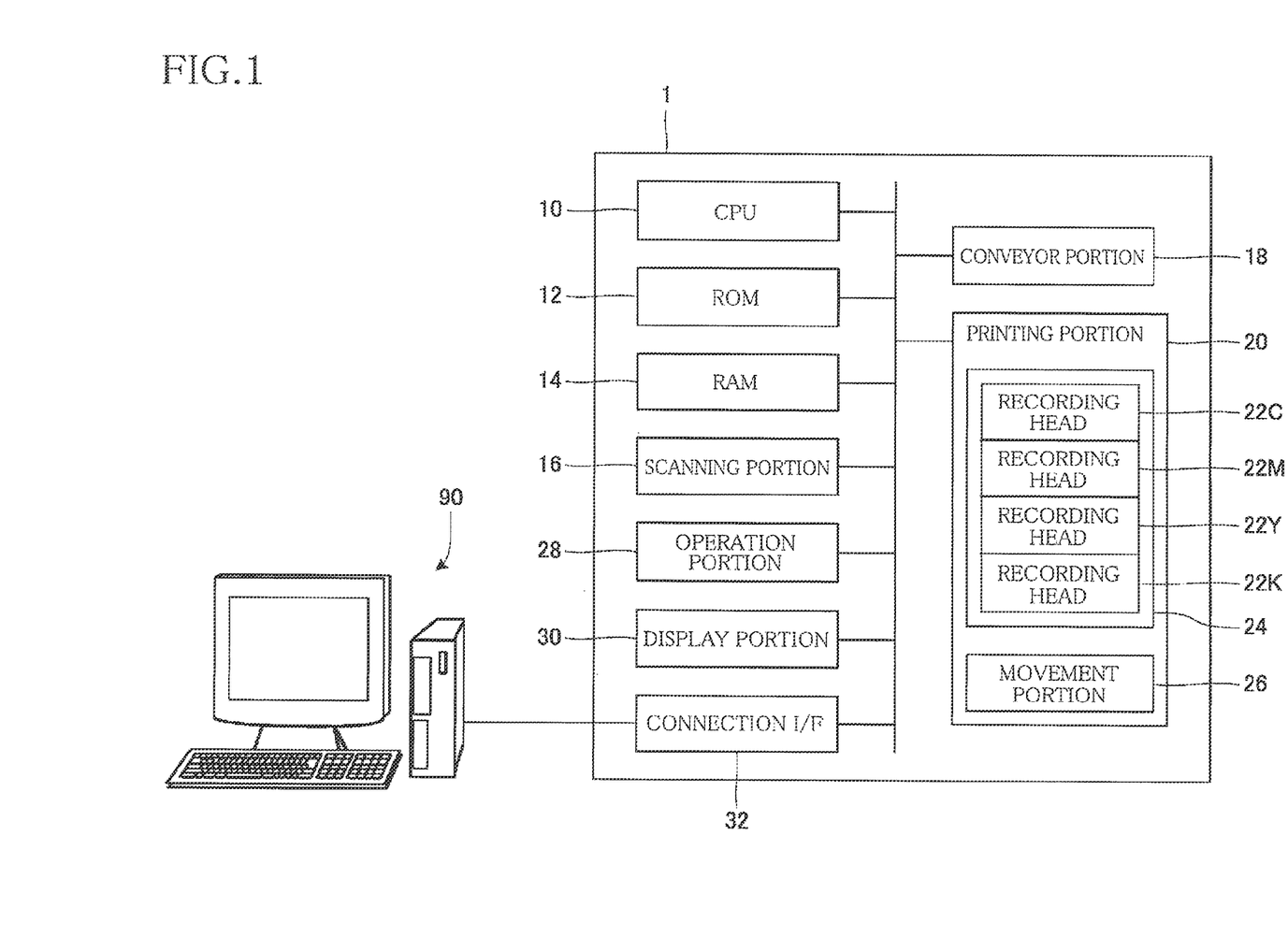
FIG. 1 is a block diagram showing a schematic structure of a printing apparatus.

With reference to FIG. 1, a printing apparatus 1 according to one embodiment of the invention will be explained. The printing apparatus 1 has a copying function. The copying function realized by the printing apparatus 1 includes a copying mode called N in 1 printing (wherein N is a natural number such as 2 or 4). In the printing apparatus 1, therefore, plural pages of documents are read, and images corresponding to the read plural pages of documents can be printed so as to be laid out side by side in a scanning direction with respect to a recording medium. In the present embodiment, there will be explained 2 in 1 printing as one example of the N in 1 printing. The printing apparatus 1 includes a CPU 10, a ROM 12, a RAM 14, a scanning portion 16, a conveyor portion 18, a printing portion 20, an operation portion 28, a display portion 30, and a connection interface (connection I/F) 32.

The CPU 10 executes computing processing and controls the printing apparatus 1. The ROM 12 stores a computer program for print processing (FIG. 2) which will be explained and various computer programs for processing executed in the printing apparatus 1. The RAM 14 is a storage area utilized when the CPU 10 executes the computer programs. In the RAM 14, there is stored information (data) and the like utilized in various processing. When the 2 in 1 printing is performed, the RAM 14 stores image data corresponding to images read by the scanning portion 16 and laid out side by side in the scanning direction. Various functional portions are realized such that the CPU 10 executes various programs stored in the ROM 12 utilizing the RAM 14, and various functions are executed in the printing apparatus 1.

The scanning portion 16 is a CIS-type or a CCD type scanner mechanism The scanning portion 16 is configured to read a document set in the printing apparatus 1, in a unit of line extending in a first direction from one end to the other end in a second direction orthogonal to the first direction. The first direction coincides with a widthwise direction of the document to be read. The second direction coincides with a longitudinal direction of the document to be read. Where the size of the document is an A4 size, the widthwise direction (the first direction) coincides with a direction on a short-side of the A4-size document having a dimension of 210 mm while the longitudinal direction (the second direction) coincides with a direction on a long-side of the A4-size document having a dimension of 297 mm.

The conveyor portion 18 conveys a recording medium. On the recording medium conveyed by the conveyor portion 18, there is printed an image based on image data corresponding to a document which has been read by the scanning portion 16. The conveyor portion 18 includes rollers for conveying a recording medium, such as a sheet-supply roller and discharge rollers. The conveyor portion 18 is configured to pick up, one by one, the recording media set on a supply tray (not shown) or the like, to convey the picked recording medium toward the printing portion 20, and to subsequently convey the recording medium reached the printing portion 20 so as to pass therethrough. The direction in which the recording medium is conveyed by the conveyor portion 18 is referred to as a "conveyance direction". The conveyor portion 18 is similar to that of commercially practical printing apparatuses, and an explanation of the conveyor portion 18 is accordingly dispensed with.

Figure 3:
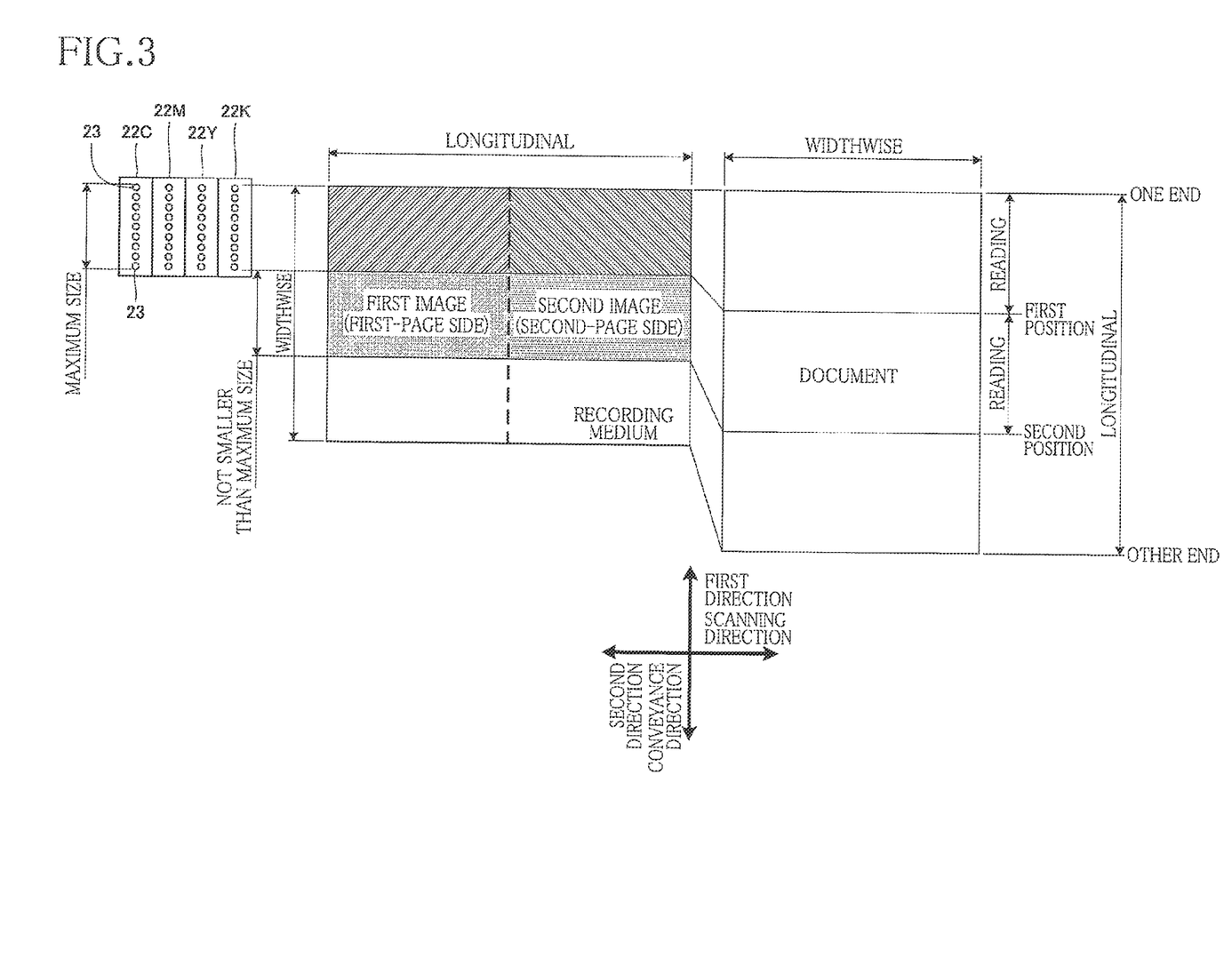
FIG. 3 is a view for explaining the print processing.

The printing portion 20 is an ink-jet printing mechanism and includes recording heads 22C, 22M, 22Y, 22K, a carriage 24, and a movement portion 26. The recording head 22C is for ejecting cyan ink. The recording head 22M is for ejecting magenta ink. The recording head 22Y is for ejecting yellow ink. The recording head 22K is for ejecting black ink. The respective colors of inks are supplied from corresponding ink cartridges in which the respective colors of inks are accommodated, to the corresponding recording heads 22C, 22M, 22Y, 22K. Each ink is ejected to the recording medium on which an image is to be printed, from nozzles 23 (FIG. 3) formed in a corresponding one of the recording heads 22C, 22M, 22Y, 22K. In FIG. 3, there is shown a surface of each of the recording heads 22C, 22M, 22Y, 22K which is to be opposed to the recording medium conveyed by the conveyor portion 18 and in which the nozzles 23 are formed. Where image printing is performed using ink whose color is other than the above-indicated four colors, the printing portion 20 includes a recording head for that color. That is, the printing portion 20 includes recording heads corresponding to colors of inks used in image printing. In the present embodiment, the recording heads 22C, 22M, 22Y, 22K are referred to as the recording heads 22 where the recording heads 22C, 22M, 22Y, 22K are collectively treated or where it is not necessary to distinguish the recording heads 22C, 22M, 22Y, 22K from each other.

The recording heads 22C, 22M, 22Y 22K are mounted on the carriage 24 so as to be arranged adjacent to each other in the scanning direction orthogonal to the conveyance direction. The carriage 24 on which the recording heads 22C, 22M, 22Y, 22K are mounted is reciprocated in the scanning direction when an image is printed. The movement portion 26 is a mechanism for reciprocating the carriage 24. The movement portion 26 includes a drive mechanism constituted by a timing belt to which the carriage 24 is fixed, a motor, etc. The recording heads 22C, 22M, 22Y, 22K mounted on the carriage 24 which is reciprocated in the scanning direction by the movement portion 26 eject the inks of the different colors at suitable timing during the movement in the scanning direction. The carriage 24 and the movement portion 26 are similar to those in the commercially practical printing apparatuses, and an explanation thereof is accordingly dispensed with.

The operation portion 28 includes a plurality of keys. A user operates the operation portion 28, thereby inputting a suitable command to the printing apparatus 1. For instance, the user operates the operation portion 28 and inputs a print command for N in 1 printing (2 in 1 printing in the present embodiment). The display 30 displays suitable information. The connection I/F 32 is a communication interface to connect the printing apparatus 1 and an external device 90 for allowing data communication therebetween.

The 2 in 1 printing of the present embodiment will be explained. In the 2 in 1 printing of the present embodiment, a first image based on or represented by first image data corresponding to a first-page document (hereinafter referred to as the "first document" where appropriate) and a second image based on or represented by second image data corresponding to a second-page document (hereinafter referred to as the "second document" where appropriate) are laid out side by side in a longitudinal direction of the recording medium, such that the first direction of each of the first document and the second document coincides with the longitudinal direction of the recording medium. In this instance, the second direction of each of the first document and the second document coincides with a widthwise direction of the recording medium. In the conveyor portion 18, the recording medium is conveyed in the conveyance direction, such that the longitudinal direction of the recording medium is orthogonal to the conveyance direction, in other words, such that the longitudinal direction of the recording medium coincides with the scanning direction. Accordingly, in the printing apparatus 1, the 2 in 1 printing is performed on the recording medium conveyed by the conveyor portion 18 such that the first image and the second image are laid out side by side in the scanning direction.

<Print Processing>

Figure 2:
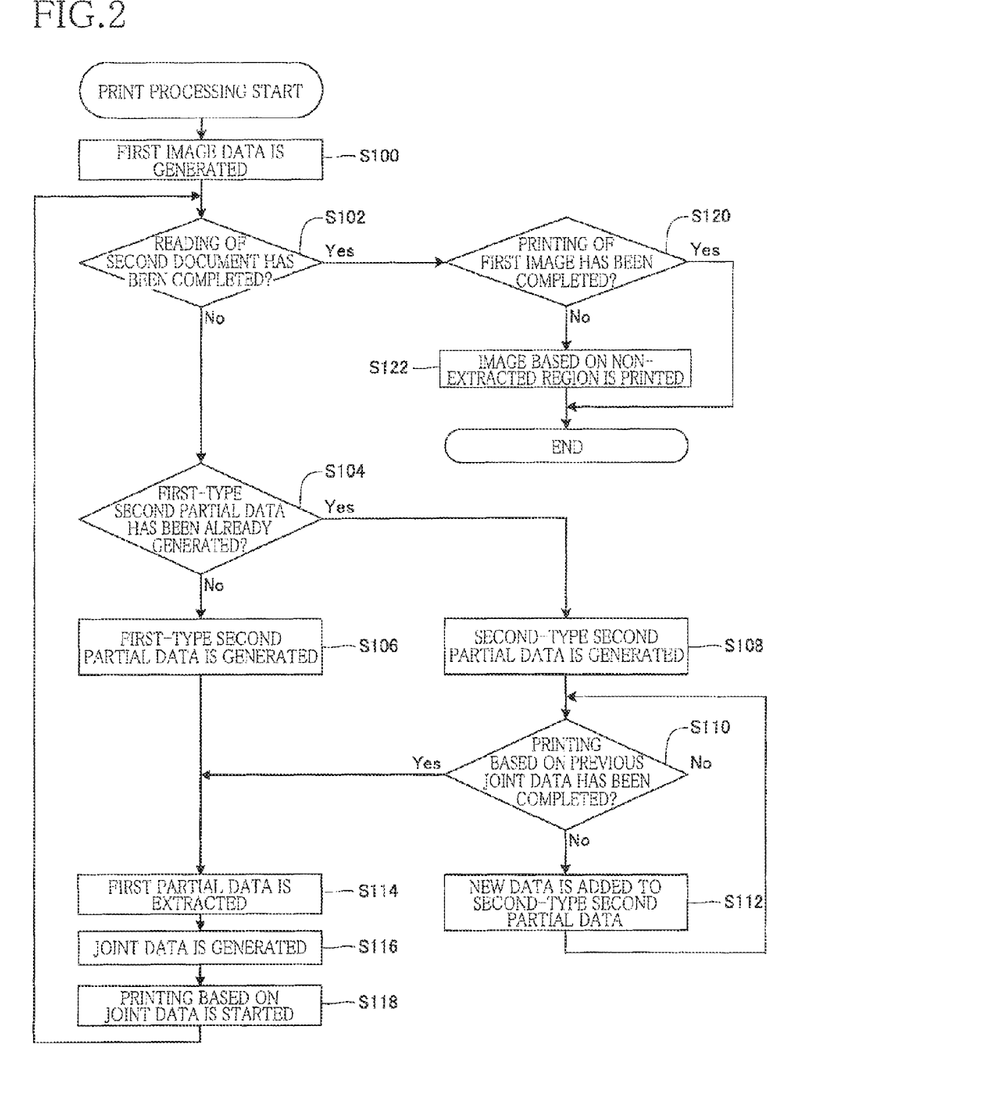
FIG. 2 is a flow chart showing print processing.

With reference to FIGS. 2 and 3, print processing will be explained. The print processing is initiated, where a print command for executing N in 1 printing (2 in 1 printing in the present embodiment) is inputted to the printing apparatus 1 through the operation portion 28 and the CPU 10 receives the print command. In this respect, the CPU 10 functions as a command receive portion. When the print command is inputted and the CPU 10 receives the print command, the CPU 10 controls the scanning portion 16 to read the first document set in the printing apparatus 1. The scanning portion 1.6 reads the first document. The CPU 10 generates the first image data corresponding to the first document the reading of which by the scanning portion 16 has been completed (S100). An image based on the generated first image data has a size corresponding to a size of a range of the recording medium on which the 2 in 1 printing is to be performed, namely, a size corresponding to a range of the recording medium in which the first image based on the first image data is laid out where the 2 in 1 printing is performed. Where the size of the first document and the size of the range of the recording medium on which the 2 in 1 printing is to he performed differ from each other, the first image based on the first image data is reduced or enlarged, in other words, the first image data is reduced or enlarged. The ratio of reduction or enlargement is identical to that in a case where the second image based on the second image data (second partial data) is reduced or enlarged, in other words, where the second image data (second partial data) is reduced or enlarged. Since the manner of changing the image size relating to the first image data is similar to that relating to the second partial data which will be explained later, the manner will be explained taking the second partial data as an example, without explaining here. (Refer to the description below relating to S106.) The CPU 10 controls the scanning portion 16 to start reading of the second document.

Subsequently, the CPU 10 judges whether the reading of the second document set in the printing apparatus 1 has been completed or not (S102). In S102, the CPU 10 judges that the reading of the second document has not been completed yet where the second document is in the process of being read by the scanning portion 16 and where the reading of the second document by the scanning portion 16 is riot started. Where the reading of the second document has been completed (S102: Yes), the CPU 10 executes processing in S120. Where the reading of the second document has not been completed yet (S102: No), the CPU 10 judges whether first-type second partial data (initial second partial data) has been already generated (S104). The first-type second partial data is generated in S106 described below. Accordingly, the judgment in S104 can be made on the basis of whether S106 has been already executed after initiation of the print processing. The first-type second partial data will be explained with reference to S106.

Where the first-type second partial data is not generated yet (S104: No), the CPU 10 generates the first-type second partial data (S106). The first-type second partial data corresponds to a partial range of the second document including one end of the second document in the second direction. (Refer to the hatched region in "SECOND IMAGE (SECOND-PAGE SIDE)" in "RECORDING MEDIUM" shown in the middle in FIG. 3.) An end position of the first-type second partial data nearer to the other end in the second direction is a first position which is intermediate between the one end and the other end in the second direction. As shown in FIG. 3, the first position is intermediate between the one end and the other end in the second direction. At the first position, the size of the partial range of the second document which includes the one end of the second document in the second direction and which is based on the first-type second partial data corresponds to a maximum size in the conveyance direction over which an image can be printed where the recording heads 22 mounted on the carriage 24 are moved from one-end side to the other-end side in the scanning direction. Hereinafter, the maximum size indicated above is referred to as the "maximum size of the recording heads 22" where appropriate. As shown in FIG. 3, the maximum size of the recording heads 22 coincides with a dimension of the row of the nozzles 23 which are arranged in the conveyance direction. The first position may be set such that the above-indicated size of the partial range of the second document is not smaller than the maximum size of the recording heads 22.

An image based on the first-type second partial data generated in S106 has a size corresponding to a size of a range of the recording medium on which the 2 in 1 printing is to be performed. Explanation will be made taking, as one example, a case in which the size of the second document and the size of the recording medium are both A4 and the second image to be printed, on the recording medium by the 2 in 1 printing is laid out in a half range (A5 size) of the A4 recording medium which is obtained by dividing the A4 recording medium into half in the longitudinal direction, as shown in FIG. 3. In this case, the image based on the first-type second partial data is reduced so as to have an image size in which a size in each of the first direction and the second direction corresponds to the A5 size. (Refer to the broken line which indicates a boundary between the two images laid out side by side in "RECORDING MEDIUM" shown in the middle in FIG. 3.) The image size corresponding to the A5 size may coincide with or be substantially equal to the A5 size, as shown in FIG. 3, or may be smaller than the A5 size by a prescribed ratio taking account of margins after printing. Explanation will be made taking, as another example, a case in which the size of the second document is A5 while the size of the recording medium is A4 and the second image to be printed on the recording medium by the 2 in 1 printing is laid out in a half range (A5 size) of the A4 recording medium which is obtained by dividing the A4 recording medium into half in the longitudinal direction. In this case, the image based on the first-type second partial data has an image size in which a size in each of the first direction and the second direction corresponds to the A5 size. The image size corresponding to the A5 size has been explained above. Where the size of the second document read by the scanning portion 16 is smaller than a size of a range of the recording medium on which the 2 in 1 printing is to be performed, the second image corresponding to the second document may be enlarged so as to correspond to the range of the recording medium in which the second image is laid out.

In S106, the CPU 10 calculates the first position according to the maximum size of the recording heads 22 and the reduction or enlargement ratio and controls the reading of the second document according to the calculated first position. The CPU 10 generates the first-type second partial data when the second document has been read from the one end to the first position in the second direction by the scanning portion 16. In an instance where the second image based on the second data has a size smaller than the A5 size with margins being taken into account, the calculation of the first position is carried out according to a reduction ratio relating to the image size after the margins have been taken into account. The generated first-type second partial data is compressed in a suitable format and stored in a suitable storage area in the RAM 14 as compressed data. After S106, the CPU 10 executes processing in S114.

Where the first-type second partial data has been already generated (S104: Yes), the CPU 10 generates second-type second partial data (subsequent or following second partial data) (S108). An affirmative decision is made in S104 (S104: Yes) in an instance where the control flow returns to S102 after implementation of S118 (which will be later explained) and thereafter S104 is again implemented. The second-type second partial data corresponds to data included in a range of the second image data corresponding to the entirety of the second document except the first-type second partial data. The second-type second partial data is data which is continuous, in the second direction, to the second partial data generated in any one of previously implemented S106, S108, and S112. Where the previously generated second partial data is the first-type second partial data generated in S106 for instance, the second-type second partial data corresponds to a partial range of the second document which is a range obtained by dividing the second document in the second direction and which ranges from the first position to a second position. (Refer to a dotted region in "SECOND IMAGE (SECOND-PAGE SIDE)" in "RECORDING MEDIUM" shown in the middle in FIG. 3.) Here, "from the first position" means that the first position is not included and means any position that follows or is subsequent to the first position. As shown in FIG. 3, the second position is nearer to the other end in the second direction than the first position and is intermediate between the one end and the other end in the second direction. At the second position, the size of the partial range of the second document from the first position corresponds to a size not smaller than the maximum size of the recording heads 22.

Suppose that the previously generated second partial data is the second-type second partial data generated in previously implemented S108. In this case, current second-type second partial data corresponds to a partial range of the second document which is a range obtained by dividing the second document in the second direction and which ranges from the previous second position (without including the previous second position) to the current second position. Where the reading of the second document by the scanning portion 16 reaches the other end of the second document in the second direction, the current second-type second partial data corresponds to a partial range of the second document which is a range obtained by the second document in the second direction and which ranges from the previous second position to the other end of the second document in the second direction. An image based on the second-type second partial data generated in S108 has a size of a range of the recording medium on which the 2 in 1 printing is to be performed. With regard to this, the above explanation with respect to the first-type second partial data in S106 holds true for the second-type second partial data, and an explanation thereof is accordingly dispensed with. In S108, the CPU 10 calculates the second position according to the maximum size of the recording heads 22, the enlargement or reduction ratio, etc., and controls the reading of the second document on the basis of the calculated second position. When the second document has been read by the scanning portion 16 from the first position or from the previous second position up to the current second position, the CPU 10 generates the second-type second partial data. The generated second-type second partial data is compressed in a suitable format and is stored in a suitable storage area in the RAM 14 as compressed data.

After S108, the CPU 10 judges whether printing of an image based on the joint data generated in previously implemented S116 has been completed (S110). S116 will be later explained. Where printing of the image based on the previous joint data is being controlled, the CPU 10 makes a negative decision in S110 (S110: No). In this case, the CPU 10 controls the printing of the image to be continued and add data corresponding to a newly read range by the reading of the second document that is being continued by the scanning portion 16, to the second-type second partial data generated in S108. As in S108, the second-type second partial data to which the new data corresponding to the newly read range has been added is compressed, and is stored in a suitable storage area in the RAM 14 in the compressed state. Thereafter, the control flow returns to S110 in which the CPU 10 again judges whether the printing based on the previous joint data has been completed. Where the CPU 10 judges that the printing of the image based on the previous joint data is not being controlled and accordingly the printing of the image based on the previous joint data has been completed (S110: Yes), the control flow goes to S114.

In S114, the CPU 10 expands the first image data stored in the compressed state in the RAM 14 and extracts first partial data from the expanded first image data. The first partial data to be extracted corresponds to a partial range of the first document which is obtained by dividing the first document in the second direction and which is laid out side by side with respect to the partial range of the second document based on the second partial data in a state in which the first image and the second image are laid out side by side in the scanning direction. Suppose that the second partial data has been generated in S106. In this instance, the CPU 10 extracts, from the first image data, first-type first partial data (initial first partial data) such that am image based on first-type first partial data has a size in the second direction, with reference to the one end in the second direction, which size coincides with a size in the second direction of the image based on the first-type second partial data. (Refer to a hatched region in "FIRST IMAGE (FIRST-PAGE SIDE)" in "RECORDING MEDIUM" shown in the middle in FIG. 3.

In the meantime, as described above with respect to S106, the first-type second partial data is generated when the second document has been read up to the first position corresponding to the maximum size of the recording heads 22. As shown in FIG. 3, the first-type second partial data includes the one end in the second direction, and an image based on first-type second partial data has a size in the second direction which corresponds to the maximum size of the recording heads 22. The processing corresponding to that implemented in S112 described above is not performed on the first-type second partial data. (Refer to the control flow which goes from S106 directly to S114.) Accordingly the size in the second direction of the image based on the first-type second partial data is a prescribed size. In view of this, the first-type first partial data may be extracted in advance and may be stored in a compressed format in a suitable storage area in the RAM 14. In this instance, in S114, the first-type first partial data is read out from the suitable storage area in the RAM 14 and is subsequently expanded.

Suppose that the second-type second partial data has been generated in S108. In this instance, the CPU 10 extracts, from the first image data, second-type first partial data (subsequent or following first partial data) such that an image based on the second-type first partial data has a size in the second direction, with reference to a position nearest to the one end in the second direction within a non-extracted region of the first image data, which size coincides with the size in the second direction of the image based on the second-type second partial data. (Refer to a dotted region in "FIRST IMAGE (FIRST-PAGE SIDE)" in "RECORDING MEDIUM" shown in the middle in FIG. 3.) As described in S108, the second-type first partial data includes the position nearest to the one end in the second direction within the non-extracted region, and the size in the second direction of the image based on the second-type first partial data corresponds to a size not smaller than the maximum size of the recording heads 22, as shown in FIG. 3. Suppose that the second-type second partial data has been generated in S112. In this instance, the CPU 10 extracts the second-type first partial data as in S108. As described in S112, the second-type first partial data includes the position nearest to the one end in the second direction within the non-extracted region, and the size of the image based on the second-type first partial data includes an image based on the newly added data. The non-extracted region is a region of the first image data corresponding to the first document, from which the first partial data is not yet extracted in already implemented S114 up to the previous execution of the print processing.

Subsequently, the CPU 10 generates the joint data in which the second partial data generated by the above-described processing and the extracted first partial data are joined (S116). Suppose that the S106 has been implemented. In this instance, the CPU 10 generates first-type joint data (initial joint data) in which the first-type second partial data generated in S106 and the first-type first partial data generated in S114 are joined. The first-type joint data has data structure in which the hatched region in "FIRST IMAGE (FIRST-PAGE SIDE)" and the hatched region in "SECOND IMAGE (SECOND-PAGE SIDE)" in "RECORDING MEDIUM" shown in the middle in FIG. 3 are laid out side by side in the scanning direction, the two hatched regions having mutually different inclination directions. Suppose that S108 has been implemented (without S112 being implemented) or S108 and S112 have been implemented. In this instance, the CPU 10 generates second-type joint data (subsequent or following joint data) in which the second-type second partial data generated in S108 or S112 and the second-type first partial data generated in S114 are joined. The joint data generated in the instance in which S108 has been implemented has data structure in which the dotted region in "FIRST IMAGE (FIRST-PAGE SIDE)" and the dotted region in "SECOND IMAGE (SECOND-PAGE SIDE)" in "RECORDING MEDIUM" shown in the middle in FIG. 3 are laid out side by side in the scanning direction, the two dotted regions having mutually different dot densities. While not illustrated, the joint data generated in the instance in which S112 has been implemented has data structure similar to that in the instance in which S108 has been implemented.

After S116, the CPU 10 controls the conveyor portion 18 and the printing portion 20 such that printing of the image based on the generated joint data is started according to the generated joint data (S118). In the conveyor portion 18, conveyance of the recording medium is carried out. In the printing portion 20, the movement portion 26 is driven, whereby the carriage 24 on which the recording heads 22C, 22M, 22Y, 22K are mounted is reciprocated in the scanning direction and the mutually different colors of inks are ejected from the respective recording heads 22 at suitable timing according to the joint data onto the recording medium that is being conveyed in the conveyance direction. On the recording medium, there are printed the partial range of the first document and the partial range of the second document which are obtained by dividing, in the second direction, the entire image (in which the first image and the second image are laid out side by side in the scanning direction). After the printing of the image based on the joint data has been started in S118, the CPU 10 allows the control flow to go back to the processing in S102.

In the meantime, concerning the size in the second direction of each of the first document and the second document, there is a case in which the first document is shorter than the second document and the size in the second direction of the image based on the first image data is accordingly shorter than the size in the second direction of the image based on the second image data. In this case, in S114, there arises a situation in which there exists no first partial data corresponding to the partial range of the first document which is obtained by dividing the first document in the second direction and which is laid out side by side with respect to the partial range of the second document based on the second partial data. In such a case, the CPU 10 generates in S114 dummy data as the first partial data. The dummy data is white data constituted by information relating to white as color information. An image based on the dummy data has a size in the first direction which coincides with the size of the first image based on the first image data and has a size in the second direction which coincides with the size of the image based on the second partial data. The image based on the dummy data is laid out side by side with respect to the partial range of the second document based on the second partial data. Where the dummy data is generated, the CPU 10 generates in S116 joint data in which the second partial data generated in any one of S106, S108, and S112 and the dummy data are joined. Subsequently, the CPU 10 controls the conveyor portion 18 and the printing portion 20 such that printing of an image based on the joint data is started. In this instance, where the image based on the joint data is printed, in the printing portion 20, on the recording medium conveyed by the conveyor portion 18, no inks are ejected from the recording heads 22 to a region of the recording medium in which the image based on the dummy data is to be formed and which is contiguous to an end portion of the first document in the second direction.

After returning to S102, the CPU 10 makes a negative decision in S102 (S102: No) and executes the processing in S104-S118 described above, where the reading of the second document has not been completed yet. In this instance, the reading of the second document is continued. Where the reading of the second document has been completed (S102: Yes), the CPU 10 judges whether the printing of the first image has been completed (S120). Concerning the size in the second direction of each of the first document and the second document, there is a case in which the first document is longer than the second document and the size in the second direction of the image based on the first image data is accordingly longer than the size in the second direction of the image based on the second image data. In this case, a range of the first image data corresponding to a partial range of the first document which is obtained by dividing the first document in the second direction and by which the size in the second direction of the image based on the first image data is longer than the size of the image based on the second image data is not extracted as the first partial data in S114 described above. The CPU 10 makes a judgment in S120 depending upon whether there exists a non-extracted region as such first partial data. Where it is judged that the non-extracted region exists and the printing of the first image has not been completed yet (S120: No), the CPU 10 controls the conveyor portion 18 and the printing portion 20 such that an image based on the non-extracted first partial data among the first image data is printed according to the first partial data which has not been extracted in S114 (S122). After S122 or where it is judged that the non-extracted region does not exist and the printing of the first image has been completed, (S120: Yes), the CPU 10 terminates the print processing.

According to the illustrated embodiment, the following advantageous effects can be obtained.

(1) When the second document has been read by the scanning portion 16 from the one end to the first position in the second direction, the first-type second partial data corresponding to this range is generated (S106), the first-type first partial data corresponding to this range is extracted (S114), and the first-type joint data in which the first-type second partial data and the first-type first partial data are joined is generated (S116). Accordingly, even before the reading of the second document is completed (S102: No), it is possible to start the printing of the image based on the first-type joint data (S118), thereby reducing a time required for the 2 in 1 printing. Further, it is possible to advance print start timing and to suitably generate the joint data for performing smooth printing. Moreover, it is possible to suitably execute various processing for printing a plurality of images so as to be laid out side by side in the scanning direction.

(2) The second partial data is generated such that the size in the second direction of the image represented by the second partial data is based on the maximum size of the recording heads 22 (S106, S108), and the first partial data is extracted such that the size in the second direction of the image based on the first partial data coincides with the size in the second direction of the image based on the second partial data (S114). Therefore, the size in the second direction of the image based on the joint data generated in S116 corresponds to the maximum size of the recording heads 22. Accordingly, in, terms of the print range per one movement of the recording heads 22 in the scanning direction, it is possible to perform the printing that makes the most of characteristics of the recording heads 22. It is possible to suppress an increase in the number of movements of the recording had 22 mounted on the carriage 24 in the scanning direction, namely, the number of movements of the carriage 24 in the scanning direction.

(3) Concerning the size in the second direction of each of the first document and the second document, the dummy data is generated (S114) in an instance where the first document is shorter than the second document and the size in the second direction of the image based on the first image data is accordingly shorter than the size of the image in the second direction based on the second image data. By utilizing the dummy data, the position at which is printed the partial range of the second document based on the second partial data which does not have the corresponding first partial data can be conformed, in the scanning direction, to that of the partial ranges of the second document which have been printed so far. Therefore, the second image can be made so as to be continuous in the second direction (the conveyance direction). Since the dummy data does not cause ink ejection, no image is printed in the region of the recording medium which is contiguous to the end portion of the first document in the second direction. Accordingly, the first document can be suitably reproduced.

<Modified Embodiments>

The illustrated, embodiment may be modified as follows.

(1) The illustrated embodiment has been described by taking, as one example, the 2 in 1 printing in which the images of two pages are laid out side by side in the scanning direction on one surface of one recording medium. The above-described print processing is applicable to a printing in which images of a plurality of pages are laid out side by side in the scanning direction. For instance, the above-described print processing is applicable to 4 in 1 printing in which images are laid out as follows. In the 4 in 1 printing, the first image based on the first image data corresponding to the first document and the second image based on the second image data corresponding to the second document are laid out side by side in the widthwise direction of the recording medium, such that the first direction of each of the first document and the second document coincides with the widthwise direction of the recording medium. A third image based on third image data corresponding to a third-page document (hereinafter referred to as the "third document") and a fourth image based on fourth image data corresponding to a fourth-page document (hereinafter referred to as the "fourth document") are laid out side by side in the widthwise direction of the recording medium, such that the first direction of each of the third document and the fourth document coincides with the widthwise direction of the recording medium. In this instance, the thus disposed first and second images and the thus disposed third and fourth images are laid out side by side in the longitudinal direction of the recording medium. That is, the images of the four pages are laid out side by side in a 2 (the scanning direction)×2 (the conveyance direction)" format. The first direction of each of the first document and the second document and the first direction of each of the third document and the fourth document coincide with the widthwise direction of the recording medium. The second direction of each of the first document and the second document and the second direction of each of the third document and the fourth document coincide with the longitudinal direction of the recording medium.

In the conveyor portion 18, the recording medium is conveyed in the conveyance direction such that the widthwise direction of the recording medium coincides with the scanning direction. Accordingly, in the printing apparatus 1, the 4 in 1 printing is performed such that the first image and the second image are laid out side by side in the scanning direction and the third image and the fourth image are laid out side by side in the scanning direction. The above-described print processing is initially executed for printing the combination of the first document and the second document, and is subsequently executed for printing the combination of the third document and the fourth document. That is, the print processing is repeated two times. The third document and the third image respectively correspond to the first document and the first image described above. The fourth document and the fourth image respectively correspond to the second document and the second image described above. The images based on the respective first through fourth image data respectively corresponding to the first through fourth documents have respective sizes corresponding to sizes of respective, ranges of the recording medium on which the 4 in 1 printing is performed. For instance, the images based on the respective first through fourth image data are reduced so as to correspond to the respective ranges of the recording medium on which the 4 in 1 printing is performed.

(2) In the illustrated embodiment, concerning the size in the second direction of each of the first document and the second document, in an instance where the first document is shorter than the second document and the size in the second direction of the image based on the first image data is accordingly shorter than the size in the second direction of the image based on second image data, the dummy data is generated (S114) and the partial range of the second document based on the second partial data which does not have the corresponding first partial data is printed at an appropriate position. Where no first partial data exist as described above, there may be generated a command to set a print start position in the first direction of the partial range of the second document based on the second partial data such that the print start position coincides with a print start position in the first direction of the second partial data included in the joint data based on which the image has been printed, and the generated command may be added to the second partial data, in the processing corresponding to S114 and S116 described above. In this instance, the printing portion 20 prints an image based on the second partial data to which the command is added, according to the print start position set by the command. It is accordingly possible to realize the printing similar to that when the dummy data is used.

What is claimed is:

1. A printing apparatus, comprising:
    a scanning portion configured to read a document in unit of a line extending in a first direction, from one end to the other end in a second direction orthogonal to the first direction,
    a data generating portion configured to generate image data that corresponds to the document read by the scanning portion,
    a storage portion in which the image data generated by the data generating portion is stored,
    a conveyor portion configured to convey a recording medium on which an image is to be printed,
    a printing portion which includes a recording head, the printing portion being configured to reciprocate the recording head in a scanning direction orthogonal to a conveyance direction in which the recording medium is conveyed by the conveyor portion and configured to print an image based on the image data generated by the data generating portion, on the recording medium conveyed by the conveyor portion, and
    a command receive portion configured to receive a print command to print a first image based on first image data corresponding to a first document and a second image based on second image data corresponding to a second document, such that the first image and the second image are laid out side by side in the scanning direction of the recording head,
    wherein the scanning portion is configured to read the first document when the print command is received by the command receive portion and is configured to read the second document in a state in which the reading of the first document has been completed,
    wherein the data generating portion is configured
        to generate the first image data corresponding to the first document the reading of which by the scanning portion has been completed and to store the generated first image data in the storage portion,
        to generate, in a state in which the first image data is stored in the storage portion, second partial data corresponding to a partial range of the second document which is obtained by dividing the second document in the second direction and which is a range read by the scanning portion, and
        to generate joint data in which first partial data and the second partial data are joined, the first partial data being included in the first image data stored in the storage portion and corresponding to a partial range of the first document which is obtained by dividing the first document in the second direction and which is laid out side by side with respect to the partial range of the second document based on the second partial data in a state in which the first image and the second image are laid out side by side in the scanning direction, and
    wherein the printing portion is configured to print an image based on the joint data generated by the data generating portion, on the recording medium conveyed by the conveyor portion.

2. The printing apparatus according to claim 1,
    wherein the data generating portion is configured
        to extract, from the first image data stored in the storage portion, the first partial data such that an image based on the first partial data has a size in the second direction that coincides with a size in the second direction of an image based on the second partial data, and
        to generate the joint data in which the first partial data and the second partial data are joined.

3. The printing apparatus according to claim 2, wherein the data generating portion is configured to generate the second partial data such that the size in the second direction of the image based on the second partial data corresponds to a size not smaller than a maximum size in the conveyance direction over which an image can be printed where the recording head is moved from one end to the other end in the scanning direction.

4. The printing apparatus according to claim 1,
    wherein the scanning portion is configured to read the first document from the one end to the other end in the second direction and is configured to read the second document from the one end to the other end in the second direction in a state in which the reading of the first document has been completed,
    wherein the data generating portion is configured
        to generate the first image data corresponding to the first document the reading of which by the scanning portion from the one end to the other end in the second direction has been completed,
        to generate first-type second partial data corresponding to a partial range of the second document which is a range obtained by dividing the second document in the second direction and which ranges from the one end to a first position in the second direction, when the second document has been read by the scanning portion up to the first position which is intermediate between the one end and the other end in the second direction after the scanning portion had started reading the second document, to extract, from the first image data stored in the storage portion, first-type first partial data such that an image based on the first-type first partial data has a size in the second direction, with reference to the one end in the second direction, which size coincides with a size in the second direction of an image based on the first-type second partial data, when the first-type second partial data has been generated, to generate first-type joint data in which the first-type first partial data and the first-type second partial data are joined, to generate second-type second partial data corresponding to a partial range of the second document which is a range obtained by dividing the second document in the second direction and which ranges from the first position to a second position in the second direction, when the second document has been read by the scanning portion up to the second position which is nearer to the other end in the second direction than the first position and which is intermediate between the one end and the other end in the second direction, to extract, from the first image data stored in the storage portion, second-type first partial data such that an image based on the second-type first partial data has a size in the second direction, with reference to a position nearest to the one end in the second direction within a non-extracted region of the first image data, which size coincides with a size in the second direction of an image based on the second-type second partial data, when the second-type second partial data has been generated, and to generate second-type joint data in which the second-type first partial data and the second-type second partial data are joined, and wherein the printing portion is configured to print an image based on the first-type joint data on the recording medium conveyed by the conveyor portion, when the first-type joint data has been generated by the data generating portion, and to print an image based on the second-type joint, data on the recording medium conveyed by the conveyor portion, when the second-type joint data has been generated by the data generating portion.

5. The printing apparatus according to claim 4, wherein the data generating portion is configured to generate the first-type second partial data corresponding to the partial range of the second document which is the range obtained by dividing the second document in the second direction and which ranges from the one end to the first position in the second direction, when the second document has been read by the scanning portion up to the first position which is intermediate between the one end and the other end in the second direction and at which a size of the partial range of the second document from the one end in the second direction corresponds to a maximum size in the conveyance direction over which an image can be printed where the recording head is moved from one end to the other end in the scanning direction, after the scanning portion had started reading the second document, and to generate the second-type second partial data corresponding to the partial range of the second document which is the range obtained by dividing the second document in the second direction and which ranges from the first position to the second position in the second direction, when the second document has been read by the scanning portion up to the second position which is intermediate between the first position and the other end in the second direction and at which a size of the partial range of the second document from the first position in the second direction corresponds to a size not smaller than the maximum size in the conveyance direction over which the image can be printed where the recording head is moved from the one end to the other end in the scanning direction.

6. The printing apparatus according to claim 1, wherein the data generating portion is configured such that, where a size of the first document in the second direction is shorter than a size of the second document in the second direction and there exists no first partial data corresponding to the partial range of the first document which is obtained by dividing the first document in the second direction and which is laid out side by side with respect to the partial range of the second document based on the second partial data, the data generating portion generates joint data in which dummy data and the second partial data are joined, an image based on the dummy data having a size in the first direction that coincides with a size in the first direction of the first image based on the first image data and having a size in the second direction that coincides with a size in the second direction of an image based on the second partial data, the image based on the dummy data being laid out side by side with respect to the partial range of the second document based on the second partial data, and wherein the printing portion is configured such that, when the image based on the joint data generated by the data generating portion is printed on the recording medium conveyed by the conveyor portion, the printing portion controls the recording head not to eject ink to a region of the recording medium in which the image based on the dummy data is to be formed and which is contiguous to an end portion of the first document in the second direction.

7. The printing apparatus according to claim 1, wherein the data generating portion is configured such that, where a size of the first document in the second direction is shorter than a size of the second document in the second direction and there exists no first partial data corresponding to the partial range of the first document which is obtained by dividing the first document in the second direction and which is laid out side by side with respect to the partial range of the second document based on the second partial data, the data generating portion generates a command to set a print start position in the first direction of the partial range of the second document based on the second partial data such that the print start position coincides with a print start position in the first direction of the second partial data included in the joint data based on which the image has been printed, and wherein the printing portion is configured to print an image based on the second partial data according to the print start position set by the command which is generated by the data generating portion.

* * * * *